United States Patent Office 3,479,435
Patented Nov. 18, 1969

3,479,435
DITHIOKETALS OF Δ-4,9-3-KETOSTEROIDS
Gordon A. Hughes, Haverford, and Herchel Smith,
Wayne, Delaware, Pa., assignors to American
Home Products Corporation, New York, N.Y., a
corporation of Delaware
No Drawing. Filed Dec. 1, 1966, Ser. No. 598,231
Int. Cl. C07c 173/00
U.S. Cl. 424—241                    4 Claims

ABSTRACT OF THE DISCLOSURE

3,3-dithioketal derivatives of 13β-polycarbonalky-17β-hydroxygon-4,9-dien-3-ones, and pharmaceutical compositions containing them, are provided. They are powerful progestational agents with little or no anabolic or androgenic activity.

This invention relates to valuable steroidal compounds of Formula I:

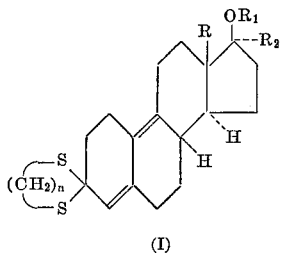

(I)

wherein:
R is alkyl of from 2 to 5 carbon atoms;
$R_1$ is hydrogen or acyl of from 2 to 20 carbon atoms;
$R_2$ is methyl, ethyl, ethynyl or chloroethynyl; and
n is a whole number of from 2 to 3.

Compounds of Formula I are powerful progestational agents with little or no anabolic or androgenic activity. Particularly preferred embodiments include compounds of Formula I wherein $R_2$ is ethynyl or chloroethynyl and wherein n is 2 (the 3-ethylenedithioketals).

Illustrative of the polycarbon groups, R, attached to the 13-position are straight and branched chain saturated alkyl groups having from 2 to 5 carbon atoms, such as ethyl, n-propyl, isopropyl, n-butyl, iso-butyl, t-butyl, n-pentyl, 2-ethylpropyl, and the like. Particularly preferred are compounds of Formula I wherein R is ethyl.

The 17-acyl group ($R_1$ in Formula I) contains from about 2 to about 20 carbon atoms. The acyl groups are, for example, derived from an alkyl carboxylic acid or from an aralkyl carboxylic acid. An alkyl portion of an acyl group may be a straight or branched chain group or a group having an aliphatic ring, with or without a substituent and it may be unsaturated. Illustrative of the group $R_1$ are acetyl, propionyl, trimethylacetyl, butyryl, isobutyryl, pentanoyl, isopentanoyl, hexanoyl, heptanoyl, octanoyl, nonanoyl, decanoyl, endecanoyl dodecanoyl, lauroyl, myristoyl, palmitoyl, oleoyl, cyclopentylformyl, cyclopentylacetyl, β - cyclopentylpropionyl, cyclohexylformyl, cyclohexylacetyl, β-(2-methylcyclopentyl)acetyl, β-(2-methylcyclohexyl)propionyl, phenylacetyl, α-phenyluropionyl, β-phenylpropionyl, diphenylacetyl, n-butyl (or other alkyl) transhexahydroterephthaloyl, and the like.

Preferred 17-acyl groups are acetyl, heptanoyl, decanoyl, undec-11-enoyl, cyclopentylpropionyl and β-phenylpropionyl.

Preferred 17-esters are those wherein R is ethyl, $R_2$ is ethynyl or chloroethynyl, and n is 2. Especially preferred esters are those in which $R_1$, $R_2$ and n are as just defined, and $OR_1$ is acetoxy.

Special mention is made of an especially valuable progestational agent of this invention: 17β-ethyl-17α-ethynyl-3,3-ethylenedithiogona-4,9-diene-17β-ol, a compound of Formula I wherein R is ethyl, $R_1$ is hydrogen, $R_2$ is ethynyl and n is 2.

The new compounds of this invention can be prepared either from a 3-ketone of Formula II:

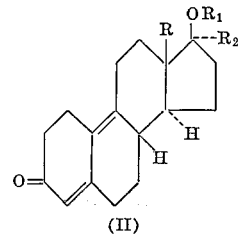

(II)

wherein R, $R_1$ and $R_2$ are as above defined, by thioketalization with ethane- or propanedithiol in the presence of an acidic actalyst; or, alternatively, from a 17-ketone of Formula III:

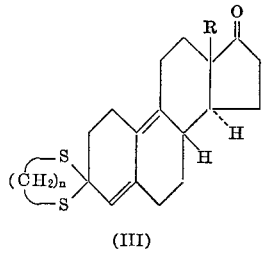

(III)

wherein R and n are as above defined, by reaction with an organometallic reagent which provides the group $R_2$ with consequent formation of a tertiary carbinol at C–17; and, optionally, when $R_1$ in the product of either route is hydrogen, a step comprising esterifying the 17β-OH group can be included.

Especially convenient is the first mentioned route: thioketalization of the corresponding 3-ketones of Formula II. In this process, the 3-ketone of Formula II is thioketalized with either ethane-1,2-dithiol or propane-1,3-dithiol in the presence of a suitable catalyst. The catalyst may be a strong acid, for example, hydrochloric acid, hydrobromic acid, p-toluenesulfonic acid, and the like, or a Lewis acid, for example, boron trifluoride, aluminum chloride or zinc chloride, and the like. According to one method, the 3-ketone is heated in a solvent such as methanol, and the dithiol is added; after cooling the mixture to about 30° C., boron trifluoride etherate is added. The product precipitates and is recovered by filtration. Alternatively, the 3-ketone is refluxed with the dithiol in a solvent such as benzene in the presence of a strong acid such as p-toluene sulfonic acid, with continuous removal of water.

Alternatively, compounds of Formula I wherein $R_1$ is hydrogen may be obtained by reduction of the corresponding 17-ketone (III) with an organometallic reagent capable of providing the group $R_2$ with consequent formation of the tertiary carbinol. Organometallic compounds which are preferred are the appropriate lithium compounds, such as lithium methyl, lithium ethyl, lithium acetylide and lithium chloroacetylide. Other reagents which may be used are the methyl or ethynyl magnesium halides, preferably the bromides.

The 17-esters of the invention may be prepared by esterification of the corresponding 17-hydroxy compound. The esterification should be carried out under sufficiently mild conditions in order to avoid dehydration of the 17-carbinol group. Thus the 17-hydroxy compound may be acylated with an appropriate acylating agent, for example, the acid, acid anhydride, acid halide or ester of the acylating acid with a lower alcohol, in a suitable medium and heating if necessary. Acylation may, in general, be effected by reaction of an acyl chloride, for example, acetyl chloride, with the 17-hydroxy compound in the presence of a base, e.g. pyridine.

Intermediates of Formula II can be prepared by techniques fully described and exemplified in the copending application of Gordon A. Hughes, Herchel Smith and David Hartley, Ser. No. 194,972, filed May 15, 1962, entitled "Novel Δ4,9,3-Ketosteroids and Method." Intermediates of Formula III are prepared by standard procedures well known to those skilled in the art. For example, if 13β-alkyl-17β-hydroxy-gona-4,9-dien-3-one, or an appropriately substituted analog thereof, is treated with ethanedithiol or propane dithiol in the presence of an acidic catalyst, there is obtained a 3,3-alkylenedithio-13β-alkyl-gona-4,9-dien-17β-ol. The 17β-ol group next is oxidized with aluminum isopropoxide in toluene and cyclohexane, or an obvious chemical equivalent of this reagent, such as chromium trioxide, and the 17-one of Formula III is obtained.

The invention in its broadest aspects includes pharmaceutical compositions comprising a compound of Formula I and a pharmaceutically acceptable carrier. The pharmaceutically acceptable carrier can be either solid or liquid. Solid form preparations include powders, tablets, dispersible granules, capsules, cachets and suppositories. A solid carrier can be one or more substances which may also act as flavoring agents, solubilizers, lubricants, suspending agents, binders or tablet-disintegrating agents; it can also be an encapsulating material. In powders, the carrier is a finely divided solid which is in admixture with the finely divided compounds. In tablets the compound is mixed with a carrier having the necessary binding properties in suitable proportions and compacted in the shape and size desired. The powders and tablets preferably contain from 5 to 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, cocoa butter, and the like. The term "composition" is intended to include the formulation of the compound with encapsulating material as carrier providing a capsule in which the compound (with or without other carriers) is surrounded by carrier, which is thus in association with it. Similarly, cachets, which are typically flour-paste cases in which medicines are often swallowed, are included. Tablets, powders, cachets and capsules can be used for oral administration.

Liquid form preparations include solutions, suspensions and emulsions. The instant compounds are insoluble in water but can be dissolved in aqueous propylene glycol solutions for parenteral injection. They can also be formulated in solution in aqueous solutions of polyethylene glycol of molecular weight of about 400. Aqueous suspensions suitable for oral use can be made by dispersing the finely divided compound in water with sodium carboxymethyl cellulose as suspending agent. Oily suspensions can be prepared by dispersing the finely-divided compound in arachis oil.

Preferably, the pharmaceutical composition is in unit dosage form. In such form, the preparation is subdivided in unit doses containing appropriate quantities of the compound. The unit dosage form can be a packaged preparation, the package containing discrete quantities of preparation, for example packeted powders, vials or ampules. The unit dosage form can be a capsule, cachet or tablet itself, or it can be the appropriate number of any of these in packaged form. The quantity of compound in a unit dose of preparation may be varied or adjusted for example from 0.5 mg. to 100 mg. (generally within the range of 0.5 to 25 mg.) according to the particular application and the potency of the active ingredient.

In the product of a total synthesis which has not included a suitable resolution step, the compounds of this invention, which have the 13-configuration, will be present in equimolar mixture or racemate form with the corresponding 13α-enantiomers. The racemates are designated (±)-13β-compounds using the Horeau-Reichstein convention approved by Fieser and Fieser, "Steroids," p. 336 (1959), in which the enantiomer of 13β-configuration is considered as the d-form and its antipode, the enantiomer of 13α-configuration, is designated the l-13β-form, so that the racemate is the d,l-13β or (±)-13β-compound. This invention is not concerned with the 13α-antipodes and where in this specification, or in the claims, a designation is used indicating a 13β-compound, as in Formula I hereinabove, or as in 13β-ethyl-17α-ethynyl-3,3-ethylenedithiogona-4,9-diene-17β-ol, without any symbol indicating a state of resolution, there is meant the compound itself without reference to its state of resolution, and excluding the 13α-enantiomer.

The following examples illustrate typical compounds and compositions within the scope of this invention. They are merely illustrative and are not to be construed as limiting the scope of the invention in any manner whatsoever.

EXAMPLE 1

13β-ethyl-17α-ethynyl-3,3-ethylenedithiogona-4,9-dien-17β-ol

A suspension of 13β-ethyl-17α-ethynyl-17-hydroxygona-4,9-dien-3-one (0.5 g., prepared by the procedure of Example 4 of U.S. patent application Ser. No. 194,972, filed May 15, 1962) in methanol is refluxed and ethane-1,2-dithiol, 0.25 ml., is added to the mixture. The mixture is cooled to 30° C. and 0.25 ml. of boron trifluoride etherate is added. After 2 hours, the precipitate is filtered off, washed with ether and dried to obtain 0.46 g. of product, M.P. 183–185° C., $\lambda_{max}$. 254 m$\mu$ ($\epsilon$24,600).

Analysis.—Calcd. for $C_{23}H_{30}OS_2$: C, 71.45; H, 7.82; S, 16.58. Found: C, 71.57; H, 7.48; S, 16.2.

EXAMPLE 2

13β-ethyl-17α-ethynyl-3,3-ethylenedithio-gona-4,9-dien-17β-ol

13β-ethyl-gona-4,9-dien-17β-ol-3-one, 0.47 g., in 5 ml. of ethanol and 0.25 ml. of ethanedithiol is treated with 0.25 ml. of boron trifluoride etherate and the mixture is allowed to stand at 25° C. for 15 minutes, cooled to 0° and filtered. The residue is washed with a small amount of cold methanol and dried to give 13β-ethyl-3,3-ethylenedithio-gona-4,9-dien-17β-ol. The thioketal, 0.38 g. in 40 ml. of toluene and 5 ml. of cyclohexane containing 0.5 g. of aluminum isopropoxide in refluxed for 3 hours under nitrogen. Water, 2.0 ml. is added to the cooled solution, followed by anhydrous sodium sulfate. The mixture is filtered and the filtrate is evaporated under reduced pressure to a residue. This is dissolved in 15 ml. of freshly distilled dimethylacetamide saturated with acetylene and 1.0 g. of lithium acetylide-ethylenediamine complex is added. The mixture is stirred in an atmosphere of acetylene for four hours, poured onto ice and extracted with ether. The ethereal solution is washed, dried, evaporated and the residue recrystallized to give the product, M.P. 183–185° C.

EXAMPLE 3

13β-ethyl-17α-ethynyl-3,3-ethylenedithio-gona-4,9-dien-17β-acetate

The procedure of Example 1 is used to prepare the named product from 1.0 g. of 13β-ethyl-17α-ethynylgona-4,9-dien-17β-acetate.

EXAMPLE 4

13β-ethyl-17α-chloroethynyl-3,3-ethylenedithiogona-4,9-dien-17β-ol

Ethanedithiol, 1.0 ml., and 1.0 ml. of boron trifluoride etherate are added to 2.0 g. 13β-ethyl-17α-chloroethynyl-gona-4,9-dien-17β-ol-3-one in 35 ml. of methanol and the mixture is allowed to stand at 20° C. for 15 minutes. After cooling the mixture to 0° C., the precipitate is filtered and recrystallized from a mixture of chloroform and methanol to obtain the product.

EXAMPLE 5

13β-ethyl-17α-chloroethynyl-3,3-ethylenedithiogona-4,9-dien-17β-acetate

13β - ethyl - 17α - chloroethynylgona-4,9-dien-17β-ol-3-one, 1.0 g., in methanol is treated with ethanedithiol and boron trifluoride etherate as described in Example 1 to obtain the named product.

EXAMPLE 6

13β-ethyl-17α-methyl-3,3-ethylenedithiogona-4,9-dien-17β-ol

A solution of 2.5 g. of 13β-ethyl-3,3-ethylenedithiogona-4,9-dien-17-one in 70 ml. of dry benzene is added to 3 molar ethereal methyl magnesium bromide, 30 ml., and the mixture is refluxed for 24 hours. The solution is poured onto ice cold aqueous ammonium chloride and the organic layer separated, washed and dried. The residue, after evaporation of the solvent, is recrystallized from methanol to give the product.

EXAMPLE 7

13β-17α-diethyl-3,3-ethylenedithiogona-4,9-dien-17β-ol

Ethyl bromide, 3.0 g., in 5 ml. of ether is added to a suspension of 0.43 g. of lithium wire in 10 ml. of ether at 10° C. in a nitrogen atmosphere. The mixture is stirred at 25° C. for 18 hours and then treated with 1.0 g. of 13β-ethyl-3,3-ethylenedithiogona-4,9-dien-17-one in 10 ml. of benzene, and the mixture is refluxed for 8 hours. After stirring at 25° C. for a further 48 hours, the mixture is poured onto crushed ice and ammonium chloride and extracted with ether. The ethereal solution is washed, dried and evaporated; and the residue is chromatographed on neutral alumina, eluting with benzene and benzene containing increasing portions of ether. After eluting starting material with benzene, the product from later eluate is combined and recrystallized from methanol to give the named compound.

EXAMPLE 8

13β-ethyl-17α-ethynyl-3,3-ethylenedithiogona-4,9-diene-17β-acetate

13β - ethyl - 17α - ethynyl-3,3-ethylene-dithiogona-4,9-dien-17β-ol, 0.5 g., is treated with 0.4 ml. of pyridne followed by 8 ml. of acetic anhydride and 4 ml. of acetyl chloride and the mixture is heated at 100° C. for 2 hours and then evaporated to dryness under reduced pressure. Ether is added to the residue and the mixture is washed with water, dried and evaporated. The residue is recrystallized from methanol to give the named product.

EXAMPLE 9

13β-ethyl-17α-ethynyl-3,3-propylenedithiogona-4,9-dien-17β-ol

The procedure of Example 1 is repeated substituting propane-1,3-dithiol for ethanedithiol and the named product is obtained.

EXAMPLE 10

13β-n-propyl-17α-ethynyl-3,3-ethylenedithiogona-4,9-dien-17β-ol

13β - n - propyl-17α-ethynylgona-4,9-dien-17β-ol-3-one, 1.0 g., in methanol is treated with ethanedithiol and boron trifluoride etherate as described in Example 1 to obtain the named product.

EXAMPLE 11

13β-n-butyl-17α-ethynyl-3,3-ethylnedithiogona-4,9-dien-17β-ol

13β - n - butyl-17α-ethynylgona-4,9-dien-17β-ol-3-one, 1.0 g., in methanol is treated with ethanedithiol and boron trifluoride etherate as described in Example 1 to obtain the named product.

EXAMPLE 12

A tablet suitable for progestational use consists of the following ingredients:

| | Mg. |
|---|---|
| 13β - ethyl - 17α-ethynyl-3,3-ethylenedithio-gona-4,9-dien-17β-ol | 5 |
| Spray dried lactose | 75 |
| Methylcellulose, 400 cps., U.S.P. | 12 |
| Powdered stearic acid | 6 |
| Talc | 2 |

EXAMPLE 13

Other tablets suitable for progestational use consist of the following ingredients:

| | Mg. | | |
|---|---|---|---|
| 13β-Ethyl-17α-ethynyl-3,3-ethylenedithio-gona-4,9-dien-17β-ol | 1.0 | 5.0 | 10.0 |
| Methylcellulose, 400 cps., U.S.P. | 12.0 | 12.0 | 24.0 |
| Stearic acid powder, U.S.P. | 3.0 | 3.0 | 6.0 |
| Talcum, U.S.P. | 1.0 | 1.0 | 3.0 |
| Lactose, spray-dried, U.S.P. ad | 100.0 | 100.0 | 100.0 |

EXAMPLE 14

Tablets suitable for progestational use consist of the steroid compounds of Examples 2–11 formulated with the inert carriers of Examples 12 and 13 and contain, respectively, 1.0, 5.0 and 10.0 mg. of the said steroids per tablet. From 1 to 3 such tablets, administered daily, are useful for treating female dysfunctions or for cyclic control.

What is claimed is:

1. A compound of the formula

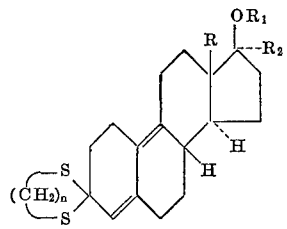

wherein:
R is alkyl of from 2 to 5 carbon atoms;
$R_1$ is hydrogen or acyl of from 2 to 20 carbon atoms;
$R_2$ is methyl, ethyl, ethynyl or chloroethynyl; and
$n$ is a whole number of from 2 to 3.

2. A compound as defined in claim 1 wherein R is ethyl, $R_1$ is hydrogen, $R_2$ is ethynyl and $n$ is 2.

3. A pharmaceutical composition comprising a compound as defined in claim 1 and an inert pharmaceutically-acceptable carrier.

4. A composition as defined in claim 3 wherein, in said compound, R is ethyl, $R_1$ is hydrogen, $R_2$ is ethynyl and $n$ is 2.

References Cited

UNITED STATES PATENTS 3,294,822 12/1966 Wettstein et al. ____ 260—397.3
3,374,255 3/1968 Windholz et al. ____ 260—397.4

OTHER REFERENCES

Smith et al., Journ. Chem. Soc., November 1964, pp. 4472–4492, pp. 4476, 4477–78, and 4491 relied on.

LEWIS GOTTS, Primary Examiner

E. G. LOVE, Assistant Examiner

U.S. Cl. X.R.

260—239.5